United States Patent [19]

Davis et al.

[11] 4,361,607
[45] Nov. 30, 1982

[54] COLOR STABILIZED MOLDED RUBBER SKIRTS IN COMBINATION WITH STAINLESS STEEL BEVERAGE SYRUP CONTAINERS

[75] Inventors: James A. Davis, Uniontown; Robert C. Koch, Akron, both of Ohio

[73] Assignee: Spartanburg Steel Products, Inc., Spartanburg, S.C.

[21] Appl. No.: 141,244

[22] Filed: Apr. 17, 1980

[51] Int. Cl.³ .......................... B65D 6/34; B32B 15/08
[52] U.S. Cl. ...................................... 428/35; 428/461; 428/492; 428/462; 428/517; 428/520; 220/69; 524/88; 524/190; 524/358; 524/420; 524/423; 524/507; 524/525; 524/526
[58] Field of Search ................. 428/35, 461, 517, 462, 428/520, 492; 206/69; 260/23.7 M, 28.5 R, 42.47; 220/69

[56] References Cited

U.S. PATENT DOCUMENTS

| | | | |
|---|---|---|---|
| 2,581,920 | 1/1952 | Kuhn | 428/514 X |
| 3,322,300 | 5/1967 | Cornelius | 220/69 X |
| 4,112,158 | 9/1978 | Creekmore et al. | 428/35 |
| 4,202,663 | 5/1980 | Haigh | 428/462 X |

OTHER PUBLICATIONS

Union Carbide, "Silane Coupling Agents", Product Information, K19979, Ucarsil Dry Silane Concentrate 18.

Primary Examiner—P. Ives

[57] ABSTRACT

A conventional stainless steel beverage syrup container having color stabilized cured rubber molded skirts adhesively bonded to stainless steel domes weld capping said container.

8 Claims, No Drawings

COLOR STABILIZED MOLDED RUBBER SKIRTS IN COMBINATION WITH STAINLESS STEEL BEVERAGE SYRUP CONTAINERS

PRIOR ART

There are numerous brands of pressure vessel containers on today's market. Typical containers are illustrated in, for example, U.S. Pat. Nos. 3,244,316; 3,322,300 and 3,390,807. The Firestone Tire & Rubber Company offers, for example, a Model "R" container for bottlers of Coca Cola; these containers are stainless steel and have molded top and bottom skirts, which skirts can vary in selected color. Firestone's sales brochure M-203-44 describes this particular container in more detail.

Representative adhesive formulations for bonding rubber to metal are found in the following U.S. Pat. Nos. 2,147,620; 2,392,618; 2,581,920 and 2,329,852. These formulations can be varied with a minimum of routine experimentation to function effectively with a particular compounded and molded rubber skirt cured or uncured for bonding to the top and bottom domes of a given stainless steel container.

BACKGROUND OF THE INVENTION

It is known in the pressurized beverage container art to color code selected molded skirt designs to identify different types of beverage syrup concentrates. Compounding will vary with the selected color pigment or dye. These skirts function to cushion the tops and bottoms of metal pressurized containers; the top skirt can also be designed to provide hand gripping areas to lift or move the container.

In the beverage syrup container art for stainless steel units, the combined container and skirts after initial construction and/or refurbishing, are immersed in a pickling solution for about 5 minutes; this immersion is in a 10 to 15% $HNO_3$ and 3 to 6% HF in tap water and at 135° to 140° F. This treatment functions, primarily to remove weld stains from the surface of the container, and give the container a frosted or satin-like finish, but also can adversely effect the appearance and condition of certain pigment colored skirts that are adhesively bound to the metal domes of the container. Color bleeding, crack formation, poor adhesion, and color fading and surface spotting are known problems. Once this takes place, the container rapidly becomes unacceptable for use in the trade. These undesirable results are also known to have been compounded by the subsequent, and repeated, cleaning step wherein the container is immersed in, for example, a 3 to 4% caustic solution for 20 to 30 minutes at 140° to 180° F.; this procedure is for routine cleaning and is used ten to twelve times a year on each container in field service. To determine the performance of a container over ten years of field service, a caustic accelerated aging procedure is used wherein the container is immersed in a 3 to 4% caustic solution for 8 hours at 180° F. Hot water baths or rinses are used, sequentially, to remove all traces of acid and caustic prior to refilling. Many of the known skirts that are plastic in nature are difficult to bond to the stainless steel domes and fail to pass the low temperature impact test; in addition, in normal handling, less cushioning is achieved.

THE INVENTION

Our invention is directed to a conventional stainless steel beverage syrup container with color stabilized molded rubber skirts adhesively bound to the stainless steel domes weld capping said container; our color stabilized skirts are fade resistant to sunlight and are bleed resistant to pickling solutions, caustic washes and hot water baths or rinses. Brightness of color is essentially uniformly retained as is the adhesive integrity of the total molded and bonded rubber skirts. It is preferred that our cured compounded rubber skirts have a durometer between about 80 and 90. Durometers ranging between 70 and 90 are acceptable. Our skirts readily adhesively bond, in the cured or green (uncured) state to stainless steel domes that weld cap a stainless steel cylinder to form the total beverage container; the surfaces of the domes are first cleaned, i.e., by sandblasting, prior to adhesively bonding our skirt in the uncured state to the cleansed surface via a cure cycle of, for example, about 9 to 30 minutes at about 300° F. to about 350° F. and a pressure of from 250 to 700 psi; a preferred cure cycle would be one of 10–11 minutes, about 320° F. at a pressure of from 400–500 psi. When our molded skirt is adhesively bound in the cured state, the cure cycle can be from 10 to 45 minutes, at about 300° F. to about 350° F. at a pressure of from 150 to 400 psi; a preferred cure cycle is one of 12 minutes, at 330° F. and a pressure of from 200 to 300 psi.

The following example is representative and demonstrates the significant performance achieved with a compounded bright red color pigment; all designated color observations were visual in nature.

EXAMPLE

A rubber masterbatch was prepared using a 1100 cc Banbury mixer; the amount of each compounding ingredient was based on parts per hundred parts rubber hydrocarbon or synthetic polymer (i.e., phr). The following sequence of addition and mixing times were utilized to prepare this masterbatch: 98.75 phr SBR[a] and 0.75 phr stearic acid were initially added to an 1100 cc Banbury mixer along with 2.50 phr of a 50/50 blend of SBR[a]/yellow color pigment[b] containing 1.25 phr yellow color pigment[b]. After ½ to 1′, a blend of 55 phr HiSil EP[d], 40 phr Barytes[e], 5 phr Lithopone[f], and 0.75 phr antioxidant[g] was Banbury mixed into the above composition initially introduced into the Banbury.

Mixing was then continuous and after 2 to 3′ continued mixing, a blend of 55 phr HiSil EP[d], 40 phr Barytes[e], 5 phr Lithopone[f], 0.75 phr antioxidant[g] and 4.5 phr of red color pigment[h] was introduced; after 4 to 5 minutes of continuous mixing, 7.0 phr of chlorowax LV[i] was added to the masterbatch. Mixing was continued for an additional 3 to 4 minutes to ensure a uniform dispersion of the additives; the mixing temperature was maintained below 320° F. This mixture was then dumped on a two roll mill for final mill mixing; this masterbatch was then allowed to cool to about 140° F.

To the above masterbatch on the two roll mill were added the following additions in the following sequence and phr. Initially, 6.0 phr zinc oxide[j] was added; next, 7.5 phr Ucarsil[k] was added; next, after continued mill mixing, 4.45 phr of a cure package consisting of 2.4 phr sulfur, Methyl tuads[l] 0.5 phr and 1.55 phr Santocure[m] was added. Mixing was continued for approximately up to 12 minutes at a temperature ranging between 140° and 180° F.

In this example:

(a) Styrene-Butadiene copolymer with 23.5% bound styrene.

(b) Yellow color pigment—Color Index No. 21095

(d) HiSil EP—A non-dusting, hydrated, amorphous, precipated silica having a specific gravity at 25° C. of 1.95±0.05 and a pH (5% suspension in water) of 6.3 to 7.5.

(e) Barytes—bleached barium sulfate (98%) with a 325 mesh top size. Meets all requirements of ASTM-D602-42.

(f) Lithopone—a fine white powdered mixture of 30% zinc sulfide and 70% by weight barium sulfate.

(g) 2,2'-methylene-bis(4-methyl-6-tert-butyl phenol), a non-staining antioxidant.

(h) Red color pigment—C.I.-46500

(i) Chlorowax LV—A non-staining chlorinated paraffin having a specific gravity of 1.10, 40% chlorine and a viscosity (Brookfield) of 9 poises.

(j) Fine particle size Zinc Oxide of commercial grade.

(k) Ucarsil—a mercapto silane, 70% by weight, dispersed on synthetic calcium silicate and having a specific gravity of 1.20, a bulk density of 26 lb/ft$^3$ and a flash point (27° C.) 80° F.

(l) Methyl tuads—TetraMethylThiuram DiSulfide (TMTDS).

(m) Santocure—N-Cyclohexyl-2-BenzothiazoleSulfenamide (CBS).

The compounded stock was then ready to be molded and adhesively bonded in the practice of our invention. This stock, uncured, was bright red and uniformly colored. It was positioned on each dome in the form of a 1¾" thick disc shaped structure weighing about 3 lbs and having a diameter of 6½". A top and bottom skirt of conventional design was then compression molded and adhesively pressure bonded to adhesive coated contact surfaces of cleaned top and bottom stainless steel dome contact surfaces, the described rubber discs were compression molded and simultaneously pressed to the adhesive coated stainless steel domes, top and bottom, for a period of about 10' at a pressure of 450 psi and at a cure and bonding temperature of about 330° F.

These resulting rubber skirted stainless steel domes were then routinely welded to cap the top and bottom of the stainless steel cylinder.

The dome surfaces of this example had an applied dry adhesive film of a thickness of about 1.5 mils on the contact surface. This adhesive composition was applied by spraying and was of the following composition; all parts are expressed in % by weight and the composition has a density of about 0.95.

(1) 11.59% Neoprene/high vinyl polybutadiene (ratio 75/25)

(2) 7.77% HAF carbon black (ASTM N-330)

(3) 3.94% ash content (4) 22.20% toluene (5) 39.40% methyl ethyl ketone (6) 13.30% Aromatic, high boiling toluene solvent having a specific gravity of 0.8756 (at 60° F.) 15.5° C., and a flash point (closed cup) of 116° F. (47° C.).

(7) 1.80% Naphthol spirits, commercial grade.

This specific adhesive formulation is available from the Dayton Coating and Chemicals Division of the Whittaker Corp. and is identified in the trade as Thixon ® OSN-2. The stainless steel domes were stamped from a 25 mil sheet of stainless steel.

Heat curing cements are commercially available and are readily applied to cleaned stainless steel surfaces by dip, brush or spray; an average applied dry film thickness of 0.8 to 2.0 mils can be utilized.

This composite cylinder for beverage syrup was then routinely pickled to remove weld stains and to impart a satin-like finish to the steel; this was followed by a hot water rinse (steam jacket) to remove all traces of the pickling solution.

After some cooling took place to facilitate handling, this beverage container was then subjected to the known accelerated aging test by immersing the complete container in a caustic solution, as herein described, this test procedure representing about 10 years of field service. To remove traces of residual caustic solution, the container was once again subjected to a hot water bath or rinse.

Visual observation of the color stabilized skirt components of the above cylinder established that the initial bright red color and uniformity of said color was maintained, in addition to the fact that the integrity of the adhesive bond was not affected. No color bleeding from our cured skirts was evidenced during said pickling, caustic and/or hot water treatments. These skirts successfully passed the low temperature impact test required for beverage containers having skirt components.

The color stabilized skirts of this example, after molding, bonding and curing, had a durometer of 82 after the container was processed through the above designated immersions and baths; there was no evidence of color fading or of softening of rubber or surface roughness.

The contact surfaces of each stainless steel dome is preferably prepared for adhesive bonding to our color stabilized molded skirts, cured or uncured, by treating said surfaces with a light pickling solution to remove residual steel drawing lubricant, followed by sandblasting and/or buffing with a wire brush.

Additional adhesive formulations that can be utilized to bond our molded skirts to cleaned stainless steel domes include the known Chemlok ® 234B general purpose elastomer bonding adhesive described in Hughson Chemicals, Division of Lord Corp. Technical Bulletin 2029J (8/76-2M); this adhesive is used in conjunction with a suitable metal primer and the polymer type is neoprene with chlorinated polyethylene in a 75/25 ratio, respectively. With appropriate compound modification, neoprene/SBR polymer, in a 60/40 ratio, can be used. The particular adhesive formulation selected is not critical.

The stainless steel dome surfaces can be prepared for adhesive bonding by sandblasting or blasting with grit. For selected adhesive formulations a metal primer coat may be required.

Curing of our color stabilized molded rubber skirts can be via irradiation, peroxide, and, for example, our preferred sulfur cure.

Our skirts are preferably compression molded and can be cured prior to adhesive bonding to the stainless steel metal domes; however, said skirts can also be molded and bonded as uncured stock; when uncured, said stock is cured on being compression molded and adhesively bound to said stainless steel domes at a pressure of about 450 psi for about 10.5 minutes at 330° F. The steel domes, prior to being adhesively coated, can be degreased with toluene and then sandblasted; chlorinated cleaning solvents can also be used to clean the dome surfaces to which the adhesive coating is applied.

Natural, synthetic rubbers and blends thereof can be used in the present invention. Such elastomers include polydienes such as polybutadiene or polyisoprene, including natural rubber, copolymers of dienes such as butadiene or isoprene with other copolymerizable monomers such as styrene, alpha-methylstyrene, an acrylic ester, methylisopropenylketone, isobutylene, acrylonitrile or an unsaturated carboxylic acid; halogenated rubbers such as polychloroprene or fluororubbers; interpolymers of one or more monolefins with a monomer which confers unsaturation on the interpolymer, for example, an unsaturated ethylene/propylene/dicyclopentadiene terpolymer, sulphurvulcanizable polyurethane rubbers; butyl rubber containing at least 0.8% unsaturation; and combinations of the above elastomers, e.g., natural rubber/butadiene-styrene copolymer blends, a mixture of a saturated copolymer of ethylene and propylene with an unsaturated interpolymer of ethylene, propylene and a monomer comprising unsaturation in the interpolymer, etc.

Color pigments that can be incorporated into our color stabilized rubber compositions for molded skirts include the following:

| | | |
|---|---|---|
| C.I. 46500 Pigment Violet 19 | | |
| C.I. 74160 Pigment Blue 15 | | |
| C.I. 74260 Pigment Green 7 | | |
| C.I. 21095 Pigment Yellow 14 | | |
| C.I. 77605 Pigment Red 104 | | |
| C.I. 12060 Pigment Orange 2 | | |
| C.I. 59300 Vat Orange 3 | | |
| C.I. 59305 Vat Orange 19 | | |
| C.I. 70510 Vat Brown 26 | | |
| C.I. 77201 Pigment Orange 23 | | |
| | Ratio | Wt. % |
| Austin Black 325 Bituminous fine black | 1 | 9.4 |
| FEF Black (ASTM Type N-550) | 2½ | 23.6 |
| SRF Black (ASTM Type N-770) | 7 | 67 |

The preceding example can be varied within the context of our total specification disclosure, as it would be understood by one skilled in the art, essentially the same results can be achieved with a minimum of routine experimentation and optimization.

Rubber formulations will vary with selected rubber component and, for example, selected color pigment. The selected adhesive formulation will be routinely compounded to be effective and compatible with the selected compounded rubber stock used to prepare our skirts.

The rubber compositions of our invention can also be used, for example, as fuel or chemical tank linings, thermal insulation, flotation gear, rubber covered rolls (especially for pickling, plating and steel finishing lines in the steel industry), rubber soles and heels for shoes, insulations or jackets for wire and cable covering, acid hose tubes, rigid hose compositions, conveyor belting, transmission belting, automobile floor mats, mud-flaps for trucks, colored matting, rubber tile, flat belting, bushings for armored personnel carrier tank track pads, ball mill liners and numerous other high durometer mechanical goods can be manufactured into finished products utilizing our color stabilized rubber composition.

What is claimed is:

1. A color stabilized rubber skirt for a beverage container resistant to color deterioration resulting from immersion in a pickling solution, a caustic solution, and a hot water bath comprising a rubbery polymer selected from a group consisting of natural rubber, synthetic rubber and blends thereof, a color pigment, a mineral filler and a mercapto silane.

2. The rubber skirt of claim 1 wherein the mineral filler is selected from a group consisting of silica, barium sulfate, a mixture of barium sulfate and zinc sulfide, and combinations thereof.

3. "The rubber skirt of claim 1 wherein the color pigment is selected from a group consisting of C.I.46500, C.I.74160, C.I.74260, C.I.21095, C.I.77605, C.I.12060, C.I.59300, C.I.59305, C.I. 70510, C.I.77201, and blends of C.I.21095 and C.I.46500 and the mercapto silane is Ucarsil, a mercapto silane, 70% by weight, dispersed on synthetic calcium silicate and having a specific gravity of 1.20, a bulk density of 26 lb/ft. and a flash point (27 degrees C.) 80 degrees F."

4. The rubber skirt of claim 1 wherein said synthetic rubber is selected from a group consisting of polybutadiene, polyisoprene, copolymers of dienes with styrene, halogenated rubbers, interpolymers of one or more monolefins with a monomer which confers unsaturation on the interpolymer, sulfur vulcanizable polyurethane rubbers, butyl rubber, and combinations thereof.

5. A stainless steel beverage container having a color stabilized rubber skirt resistant to color deterioration resulting from immersion in a pickling solution, a caustic solution, and a hot water bath comprising a rubbery polymer selected from a group consisting of natural rubber, synthetic rubber and blends thereof, a color pigment, a mineral filler and a mercapto silane.

6. The stainless steel beverage container of claim 5 wherein the mineral filler is selected from a group consisting of silica, barium sulfate, a mixture of barium sulfate and zinc sulfide, and combinations thereof.

7. "The stainless steel beverage container of claim 5 wherein the color pigment is selected from a group consisting of C.I.46500, C.I.74160, C.I.74260, C.I.21095, C.I.77605, C.I.12060, C.I.59300, C.I.59305, C.I.70510, C.I.77201, and blends of C.I.21095 and C.I.46500 and the mercapto silane is Ucarsil, a mercapto silane, 70% by weight, dispersed on synthetic calcium silicate and having a specific gravity of 1.20, a bulk density of 26 lb/ft. and a flash point (27 degrees C.) 80 degrees F."

8. The stainless steel beverage container of claim 5 wherein said synthetic rubber is selected from a group consisting of polybutadiene, polyisoprene, copolymers of dienes with styrene, halogenated rubbers, interpolymers of one or more monolefins with a monomer which confers unsaturation on the interpolymer, sulfur vulcanizable polyurethane rubbers, butyl rubber and combinations thereof.

* * * * *